(12) United States Patent
Lauer

(10) Patent No.: US 6,561,896 B1
(45) Date of Patent: May 13, 2003

(54) AUGER FOR COMBINE HEADER

(76) Inventor: David M. Lauer, 5118 NE. 42nd St., Kansas City, MO (US) 64117

( * ) Notice: Subject to any disclaimer, the term of this patent is extended or adjusted under 35 U.S.C. 154(b) by 0 days.

(21) Appl. No.: 09/575,509

(22) Filed: May 22, 2000

(51) Int. Cl.⁷ .................................................. A01F 12/34
(52) U.S. Cl. ......................................................... 460/71
(58) Field of Search ............................... 460/71, 72, 32, 460/33, 70, 110, 114, 35, 46, 80; 56/14.1, 14.5, 14.3, 14.6, 153, 220

(56) References Cited

U.S. PATENT DOCUMENTS

| | | |
|---|---|---|
| 1,662,832 A | 3/1928 | Nelson et al. |
| 2,426,922 A | 9/1947 | Carroll |
| 2,464,919 A | 3/1949 | Carroll |
| 2,477,794 A | 8/1949 | Gehl |
| 2,755,912 A | 7/1956 | Ashton |
| 2,910,819 A * | 11/1959 | Helliwell ................. 460/72 |
| 2,978,097 A | 4/1961 | Blanshine |
| 3,913,247 A | 10/1975 | Ruhl |
| 4,550,554 A | 11/1985 | Lundahl et al. |
| 4,957,198 A | 9/1990 | Miller et al. |
| 5,005,342 A | 4/1991 | Lundahl et al. |
| 5,443,352 A | 8/1995 | Schuhmacher |
| 5,875,623 A | 3/1999 | Wagstaff |
| 6,093,099 A * | 7/2000 | Groff ........................ 460/71 |

* cited by examiner

*Primary Examiner*—Robert E. Pezzuto
(74) *Attorney, Agent, or Firm*—Shook Hardy & Bacon

(57) ABSTRACT

An auger for a combine includes a central tube having an outer cylindrical surface and having a first diameter; flighting extends from the outer surface of the central tube. The flighting has an outer edge. An auger diameter is defined as the diameter extending from a top edge of the flighting to the bottom edge of the flighting. The first diameter is approximately 25 percent of the outer diameter.

9 Claims, 1 Drawing Sheet

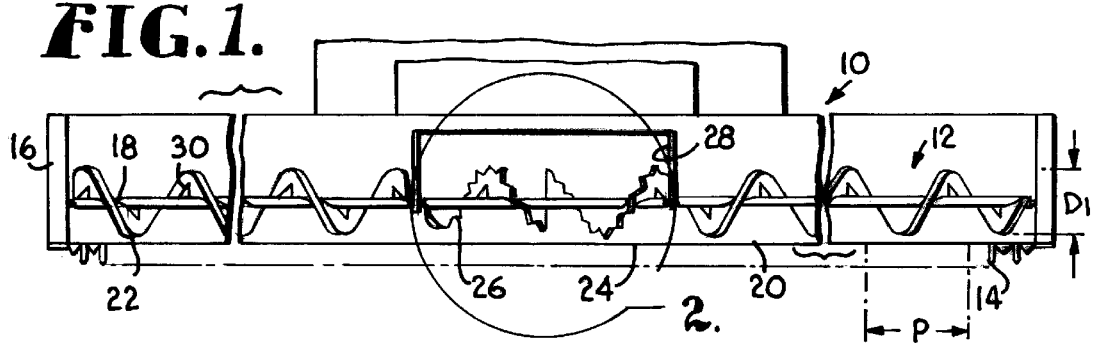
FIG. 1.
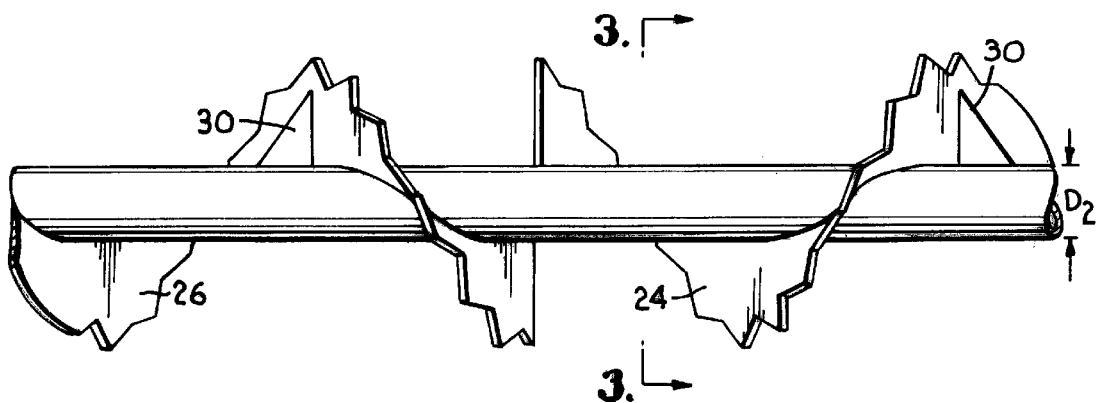
FIG. 2.
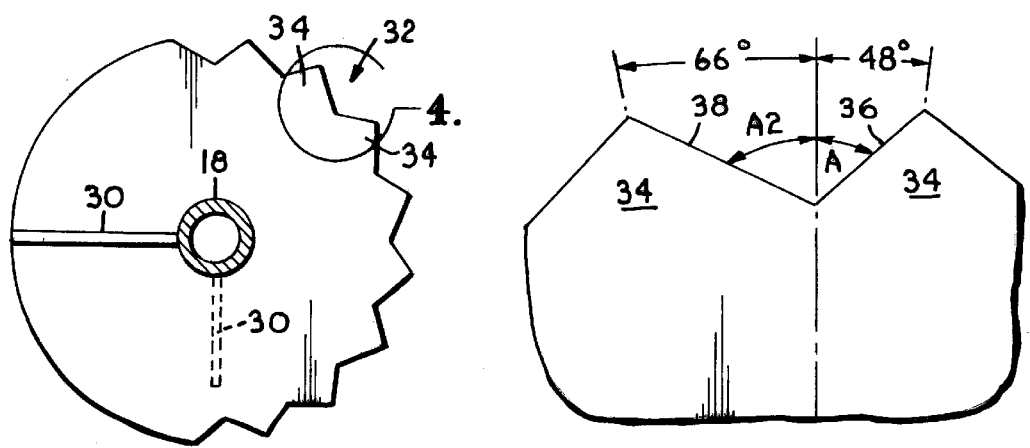
FIG. 3.
FIG. 4.

AUGER FOR COMBINE HEADER

FIELD OF THE INVENTION

This invention relates to an auger for a combine header, and, in particular, to an auger allowing longer length combine headers and lower maintenance combine headers.

BACKGROUND OF THE INVENTION

In the past, the maximum combine header length that was available was approximately 30 feet. It was found that once a header went beyond 30 feet, the auger used to convey cut crop stalks to the central portion of the header and thereafter into the separator machinery of the combine would not operate efficiently. In particular, the center auger tube of most of the combine headers in the past was at the very least approximately one third of the overall diameter of the auger. The overall diameter of the auger is the distance from the edge of the top of the flights of the augers through the center tube to the lower edge of the flights. More specifically, in a GLEANER combine header manufactured by AGCO, a header auger would have a 30-inch overall diameter. Sixteen inches of that overall diameter would be comprised of the diameter of the inner tube. Thus, the center tube of the GLEANER header would be approximately 53.3 percent of the overall diameter of the auger. In a Case International Harvester combine, with an overall auger diameter of 24 inches, the center tube would comprise approximately 14 inches of the overall diameter. Thus, in a Case International Harvester header, the center tube is approximately 58.3 percent of the overall diameter header. In a John Deere combine header having a 24-inch overall diameter, the central tube would comprise approximately sixteen inches of the overall diameter. Thus, in a John Deere combine the center tube comprised approximately 67 percent of the overall diameter. The structure of these prior art combine headers do not appear to allow the construction of combine headers beyond 30 feet. More specifically, in longer combine headers, oftentimes the crop stalks are not conveyed adequately to the central portion. In fact, some of the stalks with the heads still attached flow over the top of the auger and sometimes out of the header. Still further, oftentimes the stalks and headers are not conveyed in a continuous manner to the central portion, thus resulting in large clumps running to the central portion and being ingested into the separating cylinder portion of the combine, often resulting in "slugging" of the combine.

An additional disadvantage of prior art combines having long length is the maintenance associated with the retractable finger mechanisms in the very central portion of the auger. The fingers move in and out from the central portion of the combine auger tube in a retracting manner. There is a well-known mechanism within the auger tube which allows this retraction and extension. More specifically, the fingers will extend as the portion of the auger they are located on is rotated toward the bottom platform of the header. Thereafter, they will retract as they reach the farthest position away from the bottom of the header. The mechanism to accomplish this extension and retraction is rather complex and has a variety of bearings associated therewith. Additionally, the location of the retraction and extension mechanism in the center of the combine auger is often difficult to access in order to perform maintenance or repairs.

Therefore, a combine auger is needed which alleviates the problems with the prior art combine augers discussed above.

SUMMARY OF THE INVENTION

One object of the present invention is to provide a combine auger which allows increased length of combine headers.

Another object of the present invention is to provide a combine auger header which enhances the efficiency with which stalks and heads of crops are conveyed to the central portion of the header and fed into the separator portion of the machine.

A further object of the present invention is to provide a header auger for a combine which is easy to maintain and has a minimum of moving parts.

A still further object of the present invention is to provide a header auger for a combine which prevents carryover of crop stalks during the conveyance from the outer edges of the header to the interior portion wherein they are fed to the separator mechanism of the combine.

In order to accomplish the above objectives, a header auger for a combine is provided which is rotatably positioned in a combine header. The auger includes a central tube having an outer cylindrical surface and having a first diameter. The auger includes flighting extending from an outer surface of the central tube and the flighting has an outermost edge and a screw-type orientation around the central tube. An auger diameter is defined as the diameter extending from a top edge of the flighting to the bottom edge of the flighting. The first diameter of the central tube is approximately one-fourth of the overall auger diameter.

BRIEF DESCRIPTION OF THE DRAWINGS

In the accompanying drawings which form a part of this specification and are to be read in conjunction therewith and in which like reference numerals are used to indicate like parts of the various views:

FIG. 1 is a front elevational view of a combine header having a header auger according to the present invention with the header auger rotatably mounted in the combine header;

FIG. 2 is an enlarged view of the area designated by the numeral 2 in FIG. 1 and showing the very central portion of the auger according to the present invention wherein stalks cut by the combine header are conveyed into the separator mechanism of the combine;

FIG. 3 is a cross-sectional view taken generally along line 3—3 of FIG. 2, showing the saw-toothed central portion of the combine auger according to the present invention;

FIG. 4 is an enlarged view of the area designated by the numeral 4 in FIG. 3 and showing the orientation and relevant angles of the saw-toothed flighting in the central portion of the auger.

DETAILED DESCRIPTION OF THE PREFERRED EMBODIMENTS

With reference to FIG. 1, a combine header generally indicated by the numeral 10 is shown incorporating the header auger 12 according to the present invention therein. As will be apparent to one of ordinary skill in the art, the combine header 10 is attached to the separator mechanism and propelling mechanism of a combine. One of ordinary skill in the art will understand the general manner in which the crops that are cut by the header are conveyed into the separating mechanisms of the combine wherein the grain is separated from the rest of the stalk and positioned in a bin, and thereafter the stalks are jettisoned from the separator mechanism back onto the field. Additionally, one of ordinary skill in the art will understand that various other structures and orientation of the header, for instance, the sickle bar 14, and the mounting of auger 12 to header frame 16, are well-known.

Turning now to the construction of auger 12, auger 12 is comprised of a central tube 18, a right side smooth edged flighting 20, a left side smooth edged flighting 22, a right sized central saw-toothed edge flighting 24, and a left side saw-toothed edge central flighting 26. More specifically, right side flighting 22 conveys crops cut by sickle 14 toward the center of header 10. Thereafter, right side saw-toothed flighting 24 feeds the cut crop through an opening 28 and into then relevant separator mechanism of the combine. Likewise, left side smooth edge flighting 22 conveys cut crops from the left side of the header and toward the center, and to the left side saw-toothed flighting 26 which conveys the crop through opening 28 and into the relevant separator mechanisms of the combine. Flights 20, 22, 24 and 26 all have a helical/screw configuration to accomplish the conveying to the central portion of the header, and into the separator mechanisms of the combine. With reference to FIG. 1, auger 12 has an overall diameter, D1, which is the diameter from a top edge of the flight to the bottom edge of the flight. In particular, the auger diameter could theoretically be thought of as the diameter of a cylinder which is wrapped around the outer edges of the flighting, and thereafter measured for its diameter. Auger 12 has a further center tube diameter, D2.

It has been found to be advantageous to have the diameter of central tube D2 be approximately 50 percent or less of the overall auger diameter D1. In particular, it has been found advantageous to have the diameter D2 be approximately 25 percent of diameter D1. For example, if the overall auger diameter D1 is equal to 24 inches, it has been found advantageous to have central tube diameter D1 equal to six inches or 25 percent of the overall diameter. This construction of the various diameters has been found to allow a longer length header utilizing a longer length auger 12. In particular, having the smaller inner tube 18, smaller than those found in the prior art, allows a pitch between flights as indicated by the numeral "P" in FIG. 1 to be larger, thus creating a larger open space between flights and thus allowing the accommodation of larger amounts of material to flow inwardly through the auger and into the machine. It has been found that having an auger with the above ratio unexpectedly results in increased performance of the header resulting in more efficient material handling of the header, and less clumping or clogging of the header. As also indicated above, the header construction having such a ratio allows for an increased pitch "P" of the flighting, such that the increased flighting can have, for example, a 27-inch pitch which is beyond those normally found in prior art augers.

Additionally, triangular brace members 30 can be optional and spaced along each of the flightings 20, 22, 24 and 26. Brace members 30 allow supporting of the flightings to inner tube 18.

With reference to FIG. 2, central saw-toothed flightings 24 and 26 will now be described. In contrast to flightings 20 and 22, flightings 24 and 26 have a saw-toothed edge instead of a smooth edge. This saw-toothed edging propels the material as it enters the central portion of the header through opening 28 and into the separator mechanisms of the combine.

With reference to FIG. 4, the advantageous tooth configuration is shown which has been found to increase the material handling capability of the central flighting 24 and 26. In particular, it has been found advantageous to have an asymmetrical saw-toothed configuration. In particular, the saw teeth are defined by a plurality of valleys 32 which form the various saw teeth 34. Each valley 32 is comprised of two angles A1 and A2. It has been found advantageous to have the angle A1 associated with the leading edge 36 to be 48 degrees. Further, it has been found advantageous to have the angle A2 associated with the following edge 38 to be approximately 66 degrees. Again, these relevant angles have been found to increase the material handling capability of the central flightings 24, 26.

Another advantage of the present invention has been found to be the ease with which the auger can be additionally supported in the central section by an additional bearing to prevent sagging of the auger. In particular, a relevant bearing can be positioned anywhere along the auger to add support. The fact that central tube 18 is much smaller than conventional tubes allows the ease of positioning of a bearing at any relevant position along the length of the auger and not necessarily at the edges. In particular, any sort of intermediate bearing can be attached to the back surface of the header for additional support.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. An auger for use with a combine header, comprising:
    a central tube having an outer cylindrical surface and having a first diameter;
    flighting extending from the central tube outer surface; the flighting having an outer edge;
    wherein a second diameter is defined as the diameter extending from a top edge of the flighting to a bottom edge of the flighting;
    said first diameter being 37 percent or less of the second diameter; and
    said flighting including a non-smooth crop-gripping outer edge for use in feeding crops transversely of the auger.

2. The auger of claim 1 wherein the auger is comprised of a central region, a right region, and a left region; and wherein the flighting in the left and right regions has a smooth outer edge, and wherein the flighting in the central region has saw-toothed outer edge.

3. The auger of claim 2 wherein the saw-toothed outer edge of the central region is defined by a series of valleys having a leading edge and a trailing edge, wherein the leading edge has an angle of approximately 48 degrees from a radius extending perpendicular to the central tube 18, and wherein the trailing edge has an angle between it and the radius of approximately 66 degrees.

4. The auger of claim 1 wherein the first diameter is approximately 25 percent of the second diameter.

5. A crop auger comprising:
    an elongated, rotatable support member; and
    helical flighting on the member,
    said helical flighting including an outboard portion having a smooth outer edge for use in conveying said crops toward a central portion of said auger and a substantially non-smooth crop-gripping outer edge located on said central portion for use in feeding crops transversely of the auger.

6. A crop auger as claimed in claim 5, said flighting including a left-hand helical flighting extending inwardly from one outboard portion of said member to a central portion of the member and a right-hand helical flighting extending inwardly from an opposite outboard portion of said member to the central portion of the member.

7. A crop auger as claimed in claim 6, each flighting in the central portion of the member having a crop gripping outer edge, each flighting in the outboard portions of the member having a smooth outer edge.

8. A crop auger as claimed in claim 7, said crop gripping outer edge having a saw-tooth configuration.

9. A crop auger as claimed in claim 5, said crop gripping outer edge having a saw-tooth configuration.

* * * * *